United States Patent [19]

Schwarz

[11] Patent Number: 5,527,019
[45] Date of Patent: Jun. 18, 1996

[54] DEVICE AND METHOD FOR CLEANING A FILTER

[75] Inventor: Wolfgang Schwarz, Linsengericht, Germany

[73] Assignee: Leybold Aktiengesellschaft, Hanau, Germany

[21] Appl. No.: 810,679

[22] Filed: Dec. 19, 1991

[30] Foreign Application Priority Data

Sep. 14, 1991 [DE] Germany .......................... 41 30 640.6

[51] Int. Cl.[6] ...................................................... C21B 9/10
[52] U.S. Cl. .......................................... 266/135; 266/157
[58] Field of Search ................................. 266/135, 157, 266/287; 55/96

[56] References Cited

U.S. PATENT DOCUMENTS 2,609,064  9/1952  King, Jr. ................................. 266/135
4,103,878  8/1978  Graef ..................................... 266/135
4,284,419  8/1981  Remillieux ............................. 266/157

FOREIGN PATENT DOCUMENTS 8210968  9/1983  Germany .

OTHER PUBLICATIONS

Wutz, Adam, Walcher: Theorie und Praxis der Vakuumtechnik, 4th edition, Dec. 1988, pp. 169, 170.

*Primary Examiner*—Scott Kastler
*Attorney, Agent, or Firm*—Felfe & Lynch

[57] ABSTRACT

The invention relates to a device and a method for cleaning a filter (7) disposed between a chamber contaminated with particles and a pump station. Herein a feedline (21) for oxygen or for an oxygen/inert gas mixture to the filter (7) is provided which is equipped with an arrangement (11) influencing the flow of gas. Moreover, the device has a drainage (20) for gaseous reaction products and, if necessary, inert gas from the filter (7), which is provided with an arrangement (15) influencing the throughflow of this gas.

18 Claims, 1 Drawing Sheet

DEVICE AND METHOD FOR CLEANING A FILTER

The invention relates to a device for cleaning a filter.

When melting or remelting metals under vacuum, large quantities of fine metal dusts are frequently released through evaporation from the melt. In order to protect the vacuum pumps from these metal dusts, filters are installed between melting installation and pump station. It is in these filters that these dusts subsequently accumulate.

Many metal dusts are readily inflammable and even tend toward spontaneous ignition which can lead to the so-called dust explosions. If the dust-laden filters are exposed to oxygen, thereby that they are for example opened or thereby that a remelting installation is pumped down over the filters, filter fires can occur.

It is already known in the case of small pumps to use cotton filters installed in the feedlines to these pumps, which filters are implemented so as to have a large area in order to keep the choke losses small. In pump processes with a lowest operating pressure of approximately 10 mbars filtering screens with a mesh size around 25 μm or paper filters can be used (Wutz, Adam, Walcher: Theorie und Praxis der Vakuumtechnik, 4th edition, 1988, p. 169, 170).

The invention is based on the task of describing a device and a method for the prevention of filter fires.

The advantage achieved with the invention resides in particular therein that a controlled oxidation of the filter dust is made possible so that no filter fires or dust explosions can originate. Moreover, the invention can be realized with very low expenditures because only small valves and a simple time control need to be introduced. Subsequent installation of the invention in already existing installations is also readily possible. The invention can also be used in installations in which the filters are integrated into a process chamber. In this case cleaning off the filter with inert gases, as a rule, becomes superfluous.

BRIEF DESCRIPTION OF THE DRAWINGS

An embodiment example of the invention is depicted in the drawing and will be described in greater detail in the following. Therein show:

In FIG. 1 is depicted a vacuum chamber 1 in which is disposed a crucible 2 in which for example metal 3 is being remelted. This vacuum chamber 1 preferably stands on a flat surface 4 on which is also disposed a dust collecting vessel 5. From the vacuum chamber 1 a connection leads to a filter container 6 with a filter insert 7 and specifically via a valve 8. Into the connection line 9 between valve 8 and filter container 6 is connected a supply line 10, 21 for oxygen or an oxygen/inert gas mixture, for example air, in which is disposed a valve 11. As a filter insert 7 in the filtering of metal dust a loose filter material is primarily possible which must not be wetted with a fluid such as water in order to avoid desorption. Since the heat dissipation through the filter material is low, the dissipation can take place only via a gas which has a particular minimum pressure, for example more than 100 mbars.

Figure 1:
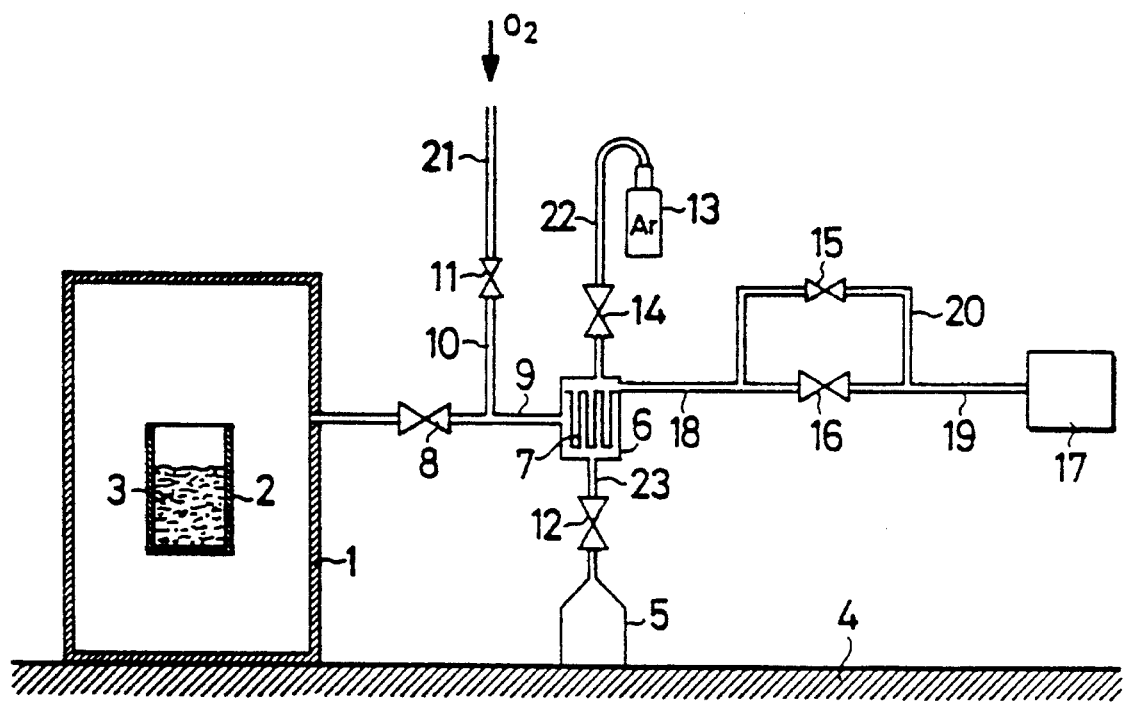
FIG. 1 a fundamental representation of a vacuum installation with a filter device.

The bottom of the filter container 6 is connected via a line 23 and a further valve 12 with the dust collecting vessel 5. On the upper side of the filter container 6 is provided an inert gas supply line 22 having a gas bottle 13 with an inert gas for example argon or nitrogen. This inert gas is supplied to the filter container 6 from the gas bottle 13 via a valve 14. The outlet of the filter container 6 is connected via two parallel-connected valves 15, 16 which connects the filter 6, 7 with the pump station 17. The parallel-connected valve 15 is disposed in a line circuit 20.

During normal operation, i.e. if the gases and metal vapors are exhausted from the vacuum chamber 1 with the aid of a pump disposed in the pump station 17 the valves 8 and 16 are opened while the valves 11, 14, and 15 are closed.

The metal dust entrained by the gas is drawn into the filter container 6 and adheres to the filter insert 7. If the filter insert 7 is saturated with the metal dust or laden with it so heavily that the intake capability of the pump is thereby noticeably reduced and therefore should be replaced by a fresh filter insert, the valves 8 and 16 are closed, i.e. the filter container 6 with the filter insert 7 is separated from the vacuum chamber 1 as well as also from the pump station 17. As soon as valves 8 and 16 are closed, valve 14 is opened whereupon to the filter container 6 inert gas is supplied. The gas supply can herein take place pulse-wise. With the inert gas metal particles are freed from the filter insert 7. These particles fall through the opened valve 12 into the dust collecting vessel 5.

After gas pulses have been impressed onto the filter insert for a given length of time, valves 12 and 14 can be closed again and valves 8 or 16, respectively can be reopened so that particles are deposited on the filter insert 7. The renewed reversal of the opening and closing conditions can shortly thereafter take place one or several times more in order to achieve a repetition of the gas pulse cleaning. Through the multiple pulse cleaning the filter insert 7 is largely freed of metal dusts.

After completion of the pulse cleaning the filter container 6 is filled with the inert gas to approximately 1000 mbars. Subsequently the small valves 11 or 15, respectively, are opened with the pump station 17 running. Thereby the inert gas in the filter container 6 is slowly replaced by oxygen or an oxygen/inert gas mixture, respectively. The oxygen introduced now has the possibility to oxidize slowly the dust which has remained on the filter material.

Valves 11 or 15, respectively, are selected so that when oxygen is pumped through in the filter container 6 a pressure of at least a few 100 mbars, better 1000 mbars, obtains. Therewith the dissipation of the heat is ensured which is generated during oxidation of the metal dust in or on the filter insert 7. The oxidation time for the entire quantity of dust is a function of the size of the filter insert 7 and of the dust deposition. Only after this oxidation has been largely completed, can the filter container 6 be completed flooded with air. The oxygen supply can be influenced through the selection of the size of valves 11 or 15, respectively or by inserting diaphrams in series with the valves 11, 15 in such a way that a shortest possible time results for the oxidation with optimum protection of the filter insert 7.

If the invention is used in installations whose filters are integrated into the process or vacuum chamber 1 the controlled introduction of air takes place via valve 11 directly into the process chamber 1 while pumping down takes place via valve 15.

Depending on the process and dust accumulation it can be useful to carry out the oxidation of the dust after each melt process in the crucible 2 or even several times during the melt process. This depends on the dust accumulation and on the degree of pyrophoricity of the dust. In any case a relatively large accumulation of inflammable dust on the filter insert 7 should be avoided as much as possible.

Figure 2:
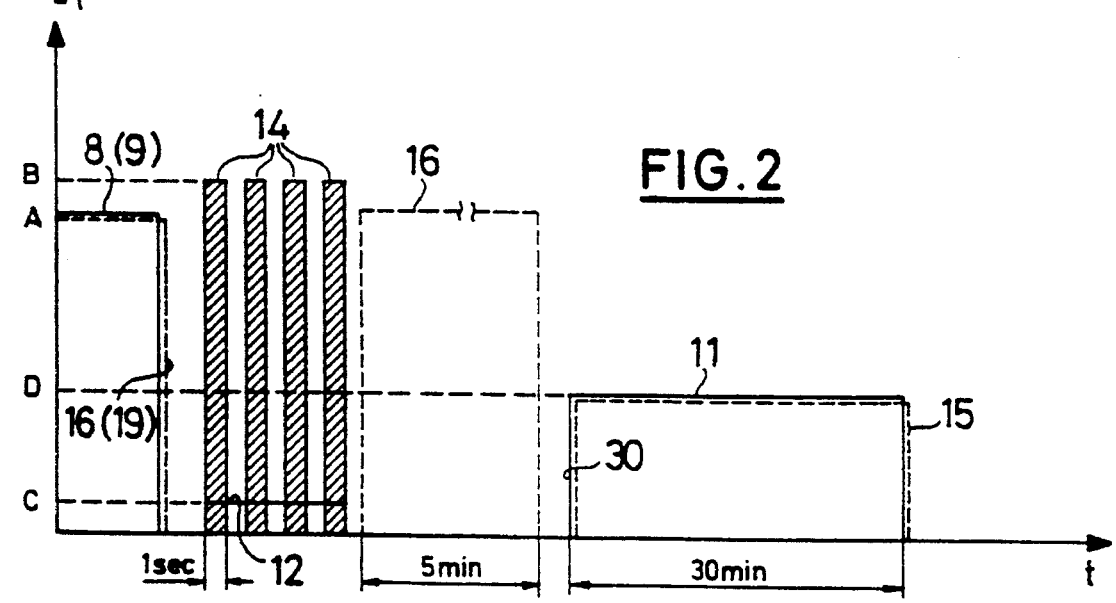
FIG. 2 a schematic time diagram of the filter cleaning process.

In FIG. 2 is again shown schematically the process of cleaning of a filter according to the invention. The abscissa herein is time wherein no linear time scale is given. The ordinate denotes the mass flow or throughput of gases or particles, respectively. Absolute measurement units are not given because of the multiplicity of possibilities. For the sake of clarity the throughputs are only shown as full throughput or zero throughput even though these throughputs are continuously regulatable. Instead of vertical slopes linear, parabolic or otherwise falling or rising slopes would result with regulated output.

If it is assumed that at the beginning of the observation the valves 8 and 16 have just been opened, so that the metal dusts in the vacuum chamber 1 are pumped out through the pump stand 17 and are purified in filters 6, 7 a throughput A is disposed in lines 9 or 18, 19, respectively. If filters 6, 7 are to be cleaned, valves 8, 16 are closed so that the throughput in lines 9, 18, 19 decreases to zero. At this point valve 14 is opened and inert gas with a throughput B pumped pulse-wise onto the filter insert. Simultaneously valve 12 is opened so that dust with a throughput C falls into the dust container 5. After completion of the pulse-wise cleaning process the valve 16 is opened, if necessary, and filter 6, 7 suctioned off. Subsequently, via valve 14 the filter container 6 is filled with inert gas to approximately 1000 mbars. Subsequently the small valves 11, 15 are opened so that oxygen flows into filter 6, 7 and oxidizes the still remaining metal particles. Simultaneously the filter container 6 is evacuated with the pump station 17 via valve 15 so that the pressure in the filter container approaches the equilibrium pressure given through the mass flow let in and the suction capability effective on the container. The oxidation product is pumped simultaneously through the pump station. Throughput D through the lines 10, 9 and 20 can be smaller than the process throughput A. However, this is not a necessary prerequisite for the method according to the invention. The rising slope 30 depicted steeply in FIG. 2 in the case of an embodiment example advisably rises very slowly for example according to an e function in order to avoid shock oxidation of the metal particles in filter 6, 7. The oxygen supply must take place very slowly so that the oxidation rate remains low and in this way sufficient time is given for the heat transport through lines, convection or irradiation. Consequently, the temperatures in the filter material can be kept so low that no thermal damages occur.

I claim:

1. Device for cleaning a filter disposed between a chamber contaminated by particles and a pump station, comprising:

a supply (21) for oxygen or an oxygen/inert gas mixture;

a filter (6, 7) coupled to the supply, the supply (21) having valve means (11) coupled to the filter for influencing the gas throughflow; a drainage (20) coupled to the filter for gaseous reaction products and any inert gas from the filter (6, 7);

the drainage having valve means (15) for influencing the throughflow of these gases.

2. Device as stated in claim 1, which includes a particle-contaminated chamber and in which the filter (6, 7) is disposed in the particle-contaminated chamber (1) itself.

3. Device as stated in claim 1, which includes a particle-contaminated chamber and in which the filter (6, 7) is disposed outside of the particle-contaminated chamber (1).

4. Device as stated in claim 3, which includes a line (9) and in which the filter (6, 7) is connected via the line (9) with the chamber (1) and which includes a controllable valve (8) in this line (9).

5. Device as stated in claim 3, which includes a pump station 17 and a line 18, 19 and in which the filter (6, 7) is connected with the pump station (17) via the line (18, 19) and in which this line (18, 19) includes a controllable valve (16).

6. Device as stated in claim 1, which includes a particle-contaminated chamber and an inert gas feed coupled thereto.

7. Device as stated in claim 3, which includes an inert gas feed (13, 22) and in which the filter (6, 7) is coupled thereto.

8. Device as stated in claim 7, in which the inert gas feed includes a controllable valve (14).

9. Device as stated in claim 4, which includes a feedline (21) for oxygen or oxygen and inert gas in the line (9) between valve (8) and filter (6, 7) and which includes a controllable valve (11) disposed in the feedline (21).

10. Device as stated in claim 5, which includes a controllable valve parallel to the valve (16) between pump station (17) and filter (6, 7).

11. Device as stated in claim 3, which includes a collecting vessel (5) for dusts and in which the filter (6, 7) is connected with the collecting vessel (5) for dusts.

12. Device as stated in claim 1, in which the filter (6, 7) includes a filter container and which device includes a collecting vessel (5), a line 23, and a controllable valve and in which between the filter container (7) of the filter (6, 7) and the collecting vessel (5), the line (23) is provided in which is disposed the controllable valve.

13. Method for cleaning a filter which is disposed between a dust supply (9) and a cleaning drainage (18, 19) wherein drawing of dust to the filter (6, 7) is carried out by means of a pump station (17), comprising:

a) closing the dust supply (9) as well as also the pure gas drainage (18, 19) after a filter process;

b) impressing the filter (6, 7) by inert gas for the purposes of cleaning;

c) with the dust supply (9) closed and the pure gas drainage (18, 19) closed, terminating the inert gas supply and supplying oxygen to the filter (6, 7); and d) suctioning the gaseous oxidation products and the inert gas as well as the unconsumed oxygen residue from the filter (6, 7).

14. Method as stated in claim 13, comprising: with the dust supply (9) closed and the pure gas drainage (18, 19) closed, filling up the filter (6, 7) with inert gas to a pressure of approximately $10^5$ Pa.

15. Method as stated in claim 13, in which the filling up the filter comprises impressing the inert gas pulse-wise onto the filter (6, 7).

16. Method for cleaning a filter contaminated with metal dust, comprising the following steps:

a) bringing metal dust from a metal containing device (1) via first valve means (8) to a filter (7) where said metal dust is deposited;

b) closing said first valve means (8) and opening second valve means (11);

c) bringing oxygen or oxygen mixture via said second valve means (11) to said filter (7), thereby oxidizing said metal dust on said filter (7);

d) removing said oxidized metal dust from said filter (7) by mechanically vibrating said filter (7).

17. Method as stated in claim 16 comprising the further step of cleaning the filter (6, 7) by supplying inert gas prior to the introduction of oxygen.

18. Method as stated in claim 17 comprising: impressing the inert gas pulse-wise onto the filter (6, 7).

\* \* \* \* \*